J. S. DAVIS.
Dinner-Box.

No. 167,648.

Patented Sept. 14, 1875.

WITNESSES:
Francis McArdle,
A. F. Terry

INVENTOR:
J. S. Davis
BY Munn & Co.
ATTORNEYS.

UNITED STATES PATENT OFFICE.

JAMES S. DAVIS, OF MONROE, MICHIGAN, ASSIGNOR TO HIMSELF AND GEORGE R. HURD, OF SAME PLACE.

IMPROVEMENT IN DINNER-BOXES.

Specification forming part of Letters Patent No. 167,648, dated September 14, 1875; application filed July 10, 1875.

*To all whom it may concern:*

Be it known that I, JAMES S. DAVIS, of Monroe, Monroe county, Michigan, have invented a new and Improved Dinner-Box, of which the following is a specification:

My invention consists of a case having a series of drawers for the solid food entering at one side between suitable partitions, and a coffee or tea holder, connected to the front by slides, in such manner as to fasten the drawers in the case.

Figure 1:
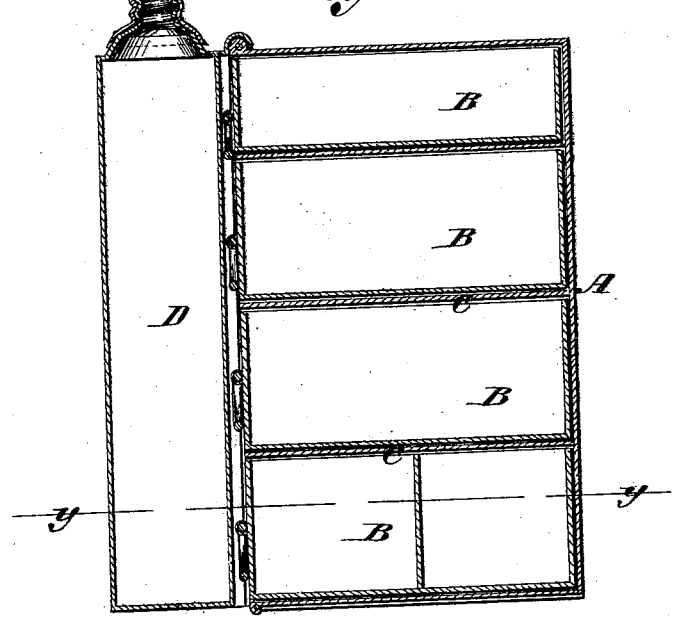
Figure 2:
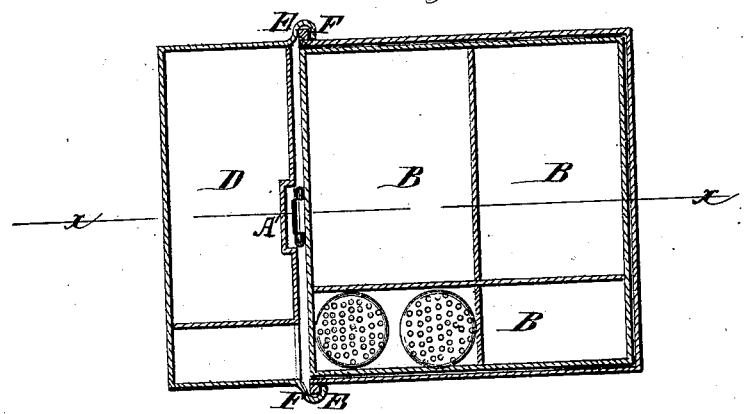

Figure 1 is a sectional elevation of the box, taken on the line $x\,x$, Fig. 2; and Fig. 2 is a horizontal section, taken on the line $y\,y$, Fig. 1.

Similar letters of reference indicate corresponding parts.

A is the case; B, the drawers for the solid food; C, the partitions between the drawers; and D the tea and coffee can, which is connected to the front of the case by the sliding of the grooved clips E down on the ribs F in front of the drawers, so as to secure them in the case until released by taking off the can for use.

This makes a simple and efficient arrangement, by which as many separate drawers or boxes as desired may be had for the solid food.

There is a groove along the inner side of the can for the ventilation of the solid food, and it is widened at A' for the handles of the drawers.

Having thus described my invention, I claim as new and desire to secure by Letters Patent—

The combination of the can D with the case A and drawers B, the said can being fitted to slide in the case and secure the drawers, substantially as specified.

JAMES S. DAVIS.

Witnesses:
GEORGE GALE,
CHARLES GALE.